US012667863B2

(12) United States Patent
Choi et al.

(10) Patent No.: US 12,667,863 B2
(45) Date of Patent: Jun. 30, 2026

(54) MULTI-SLOT DIE, COATING METHOD USING THE SAME, SLURRY SUPPLY SYSTEM, AND SLURRY SUPPLY METHOD USING THE SAME

(71) Applicant: SAMSUNG SDI CO., LTD., Yongin-si (KR)

(72) Inventors: Kyungtaek Choi, Yongin-si (KR); Young-Hak Pyo, Yongin-si (KR); Jin Seo Park, Yongin-si (KR); Wonsub Seo, Yongin-si (KR); Gisung Kim, Yongin-si (KR); Byoungkuk Kim, Yongin-si (KR); Sohun Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 34 days.

(21) Appl. No.: 18/619,325

(22) Filed: Mar. 28, 2024

(65) Prior Publication Data

US 2025/0065358 A1 Feb. 27, 2025

(30) Foreign Application Priority Data

Aug. 21, 2023 (KR) ........................ 10-2023-0109136

(51) Int. Cl.
*B05C 5/02* (2006.01)
*H01M 4/04* (2006.01)
(52) U.S. Cl.
CPC ......... *B05C 5/0262* (2013.01); *H01M 4/0402* (2013.01)

(58) Field of Classification Search
USPC ........ 118/400, 410–412, 300, 313, 315, 321, 118/325, 419, 420, 323
See application file for complete search history.

(56) References Cited

U.S. PATENT DOCUMENTS

2004/0003772 A1 1/2004 Kufner et al.
2012/0017827 A1 1/2012 Ishizu et al.
(Continued)

FOREIGN PATENT DOCUMENTS

AU 4182499 A * 12/1999 ............... D04H 1/68
CN 101166491 A * 4/2008 ......... B29C 37/0067
(Continued)

OTHER PUBLICATIONS

English Translation JP-H068365 A (Year: 1994).*
(Continued)

*Primary Examiner* — Yewebdar T Tadesse
(74) *Attorney, Agent, or Firm* — Lee IP Law, P.C.

(57) ABSTRACT

A multi-slot die includes a plurality of dies that form a continuous coating portion along a length direction on one electrode substrate that continuously proceeds in multiple columns to be spaced apart from each other along a width direction intersecting the length direction, using a supplied active material slurry, a plurality of gap adjustment assemblies that are provided corresponding to each of the dies and independently adjust gaps set between each of the dies and the electrode substrate along a discharge direction of the die and a die position adjustment assembly that is provided corresponding to the gap adjustment assemblies and independently adjusts positions of the dies with respect to the width direction.

4 Claims, 14 Drawing Sheets

(56)                References Cited

U.S. PATENT DOCUMENTS

| | | |
|---|---|---|
| 2016/0325295 A1 | 11/2016 | Li et al. |
| 2019/0374971 A1 | 12/2019 | Horinouchi et al. |
| 2022/0158158 A1 | 5/2022 | Kang et al. |

FOREIGN PATENT DOCUMENTS

| | | | |
|---|---|---|---|
| CN | 219985234 U | * | 11/2023 |
| EP | 3578272 A1 | | 12/2019 |
| JP | H068365 A | * | 1/1994 |
| JP | 2014-065021 A | | 4/2014 |
| JP | 2014-124570 A | | 7/2014 |
| KR | 10-2022-0156221 A | | 11/2022 |
| TW | M636923 U | | 1/2023 |
| WO | WO 2010/116442 A1 | | 10/2010 |

OTHER PUBLICATIONS

English Translation CN101166491A (Year: 2008).*

English Translation CN-219985234 U (Year: 2023).*

JP Office Action dated May 20, 2025 for corresponding Japanese Patent Application No. 2024-053648.

Extended European Search Report dated Jun. 11, 2025, of the corresponding European Patent Application No. 24194253.1.

Partial European search report dated Mar. 20, 2025, of the corresponding European Patent Application No. 24194253.1.

* cited by examiner

FIG. 9

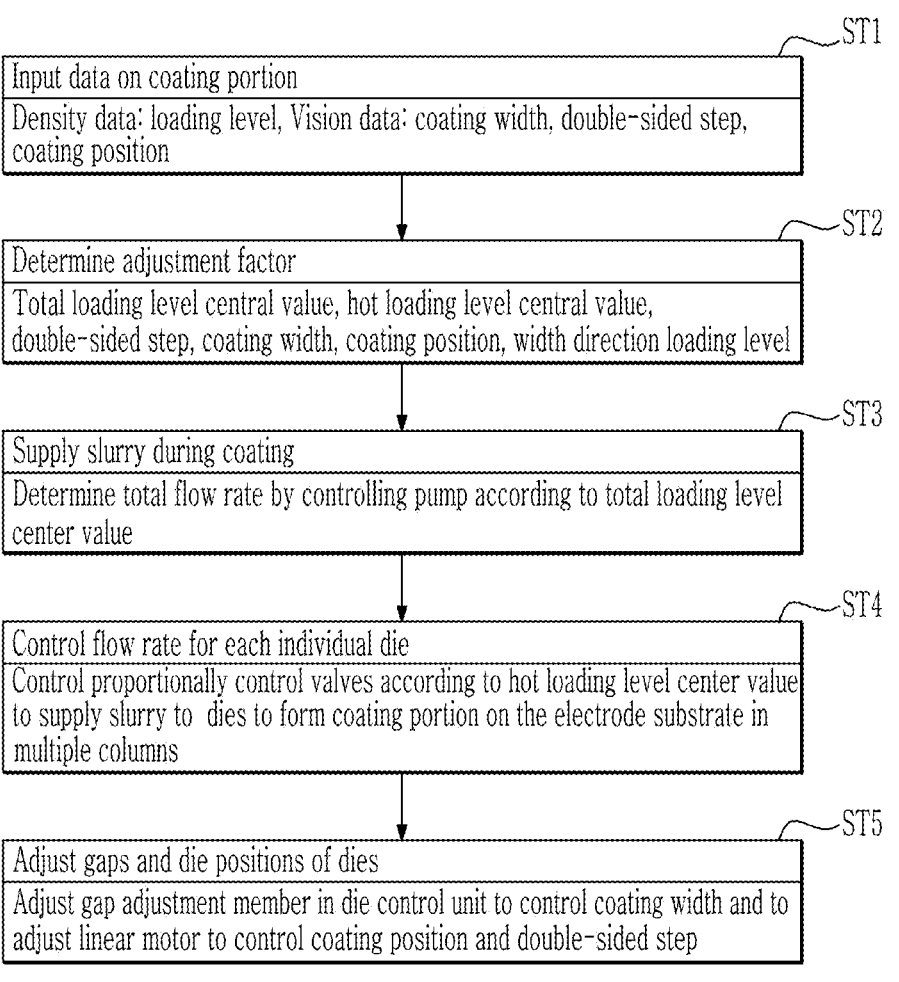

ST1

| Input data on coating portion |
|---|
| Density data: loading level, Vision data: coating width, double-sided step, coating position |

ST2

| Determine adjustment factor |
|---|
| Total loading level central value, hot loading level central value, double-sided step, coating width, coating position, width direction loading level |

ST3

| Supply slurry during coating |
|---|
| Determine total flow rate by controlling pump according to total loading level center value |

ST4

| Control flow rate for each individual die |
|---|
| Control proportionally control valves according to hot loading level center value to supply slurry to dies to form coating portion on the electrode substrate in multiple columns |

ST5

| Adjust gaps and die positions of dies |
|---|
| Adjust gap adjustment member in die control unit to control coating width and to adjust linear motor to control coating position and double-sided step |

MULTI-SLOT DIE, COATING METHOD USING THE SAME, SLURRY SUPPLY SYSTEM, AND SLURRY SUPPLY METHOD USING THE SAME

CROSS-REFERENCE TO RELATED APPLICATION

This application claims priority to and the benefit of Korean Patent Application No. 10-2023-0109136 filed in the Korean Intellectual Property Office on Aug. 21, 2023, the entire contents of which are incorporated herein by reference.

BACKGROUND

1. Field

Embodiments relate to a multi-slot die that coats an active material slurry on an electrode substrate of a rechargeable battery, and relate to a coating method using the same, a slurry supply system, and a slurry supply method using the same.

2. Description of the Related Art

A rechargeable battery is a battery that is repeatedly charged and discharged, unlike a primary battery. A small capacity rechargeable battery is used in a small portable electronic device such as a mobile phone, a notebook computer, and a camcorder, while a large capacity rechargeable battery may be used as a power source for driving a motor of a hybrid vehicle and an electric vehicle.

For example, the rechargeable battery includes an electrode assembly for the charge and discharging, a pouch accommodating the electrode assembly, and an electrode terminal that electrically connects the electrode assembly and draws it out of the pouch. The electrode assembly includes a winding type in which a negative electrode plate and a positive electrode plate are wound with a separator interposed therebetween, and a stacking type in which a negative electrode plate and a positive electrode plate are stacked with a separator interposed therebetween.

An electrode plate process of manufacturing an electrode plate includes a mixing step of mixing an active material slurry, a coating step of coating a coating portion of the active material slurry to an electrode substrate in multiple columns, a pressing step of compressing the coating portion of the active material slurry, and a slitting step of cutting the electrode substrate according to the columns of the coating portion.

The electrode plate process equipment is a slot die coating an active material slurry, and allows to be coated with a positive or negative active material slurry mixed on an electrode substrate of Al or Cu at a predetermined width and thickness and to be dried to maintain a predetermined loading level (mg/cm$^2$).

The multi-column coating slot die may cause a defect in the press stage equipment due to a defective loading level, and may cause a defect in the winding equipment due to a step in the coating width at both coating portions of the electrode substrate.

During multi-column coating, independent control of each column among the multiple columns of coating portions is not possible in a single slot die. That is, if viewed from the width direction of the slot die with reference to FIG. 1, the supply flow rate of the active material slurry is high at 1.0 m/s at the center and low at 0.994 m/s at both ends. As a result, the deviation of the loading level in the width direction of the slot die becomes large to 0.006 m/s, and the step on both sides of the coating part becomes large.

SUMMARY

Embodiments include a multi-slot die. The multi-slot die includes a plurality of dies that form a continuous coating portion along a length direction on an electrode substrate that continuously proceeds in multiple columns to be spaced apart from each other along a width direction intersecting the length direction, using a supplied active material slurry, a plurality of gap adjustment assemblies that are provided corresponding to each of the dies and independently adjust gaps set between each of the dies and the electrode substrate along a discharge direction of each of the dies and a die position adjustment assembly that is provided corresponding to the gap adjustment assemblies and independently adjusts positions of the dies with respect to the width direction.

Each of the plurality of gap adjustment assemblies may include a die support block that supports each of the dies and moves in the discharge direction, a gap guide that is coupled to the die support block and moves the die support block in the discharge direction to adjust a respective one of the gaps and a first fixing plate supporting the gap guide.

The die position adjustment assembly may include a plurality of plate support blocks supporting the first fixing plate corresponding to each of the gap adjustment assemblies and moving in the width direction, a position guide coupled to the plate support blocks to adjust a die position by moving each of the plate support blocks in the width direction and a second fixing plate supporting the position guide.

The multi-slot die, further including a plurality of die control units coupled to each of the dies to control the respective one of the gaps and the die position of each of the dies.

Each of the die control units may include a coupling member coupled to a coupling hole provided in each of the dies, a gap adjustment member adjusting the coupling member in a gap adjustment direction, a lifting plate including the coupling member and the gap adjustment member and a lifting cylinder coupled to the lifting plate to be fixed to a side plate.

The multi-slot die may further include a base plate supporting the second fixing plate, and a linear motor provided on a lower side of the base plate, wherein the side plate may be installed on a moving member of the linear motor.

Embodiments include a multi-slot die coating method. The method includes a first step of inputting data on a loading level, a coating width, a double-sided step, and a coating position of a coating portion to be applied with an active material to a continuously supplied electrode substrate, a second step of determining adjustment factors of a total loading level center value, a hot loading level center value, a double-sided step, a coating width, a coating position, and a width direction loading level, a third step of determining a total amount of active material slurry to be supplied by controlling a pump that supplies an active material slurry and a three-way valve installed between the pump and a manifold according to the total loading level center value, during coating, a fourth step of proportionally controlling control valves according to the hot loading level central value to control a flow rate for each individual die to supply slurry to each die to form multiple columns of coating portions on the electrode substrate, during coating, and a fifth step of adjusting gaps and positions of the dies according to the double-sided step, the coating width, the coating position, and the width direction loading level.

In the fifth step, a position of each of the dies may be adjusted according to the double-sided step.

In the fifth step, a gap of each of the dies may be adjusted according to the coating width, the coating position and the width direction loading level.

In the first step, new data on the loading level, coating width, coating position and double-sided step obtained in the fifth step may be compared with existing data on the loading level, coating width, coating position and double-sided step that are previously inputted.

In the second step, by comparing the new data and the existing data, adjustment factors may be determined.

Embodiments include a slurry supply system. The system includes a manifold that supplies an active material slurry to be applied to an electrode substrate continuously supplied by driving a pump and a three-way valve to a plurality of dies, a plurality of control valves coupled to the manifold, a plurality of pipes respectively coupling the control valves to the dies and a tank coupling the three-way valve to the pump.

The control valves may be proportional control valves.

The pipes may be flexible pipes.

Embodiments include a slurry supply method. The method includes a first step of supplying an active material slurry to be applied to an electrode substrate continuously supplied by driving a pump and a three-way valve to a manifold, a second step of controlling an amount of slurry to be supplied to a plurality of pipes by controlling a plurality of control valves coupled to the manifold and a third step of supplying a controlled amount of slurry to each of a plurality of dies coupled to the pipes.

In the second step, the control valves may be proportionally controlled.

BRIEF DESCRIPTION OF THE DRAWINGS

Features will become apparent to those of ordinary skill in the art by describing in detail exemplary embodiments with reference to the attached drawings, in which:

FIG. 9 illustrates a flowchart of forming a multi-column coating portion on an electrode substrate by applying an active material slurry to the electrode substrate using a multi-slot die coating method according to one or more embodiments of the present disclosure;

DETAILED DESCRIPTION

Figure 1:
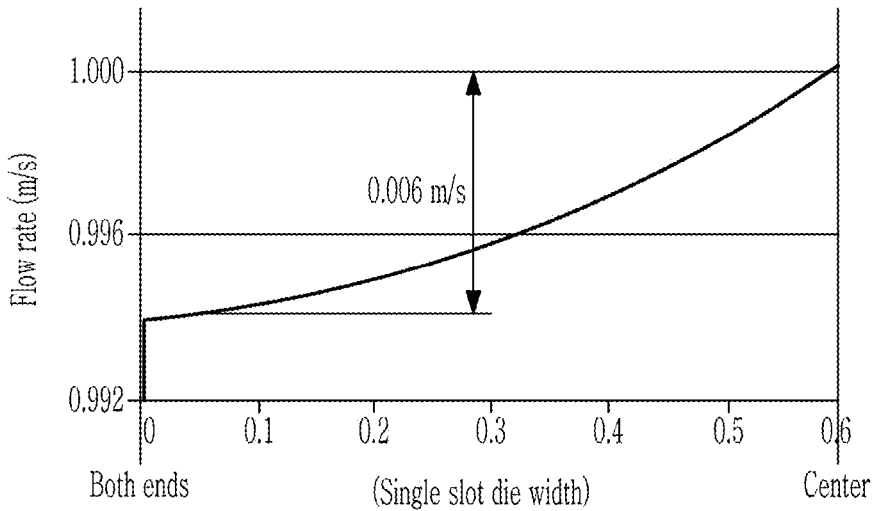
FIG. 1 illustrates a graph of a flow rate distribution of slurry along a width direction of a slot die (electrode substrate) according to the prior art.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those of ordinary skill in the art.

In the drawing figures, the dimensions of layers and regions may be exaggerated for clarity of illustration. It will also be understood that if a layer or element is referred to as being "on" another layer or substrate, it can be directly on the other layer or substrate, or intervening layers may also be present. Further, it will be understood that if a layer is referred to as being "under" another layer, it can be directly under, and one or more intervening layers may also be present. In addition, it will also be understood that if a layer is referred to as being "between" two layers, it can be the only layer between the two layers, or one or more intervening layers may also be present. Like reference numerals refer to like elements throughout.

Figure 2:
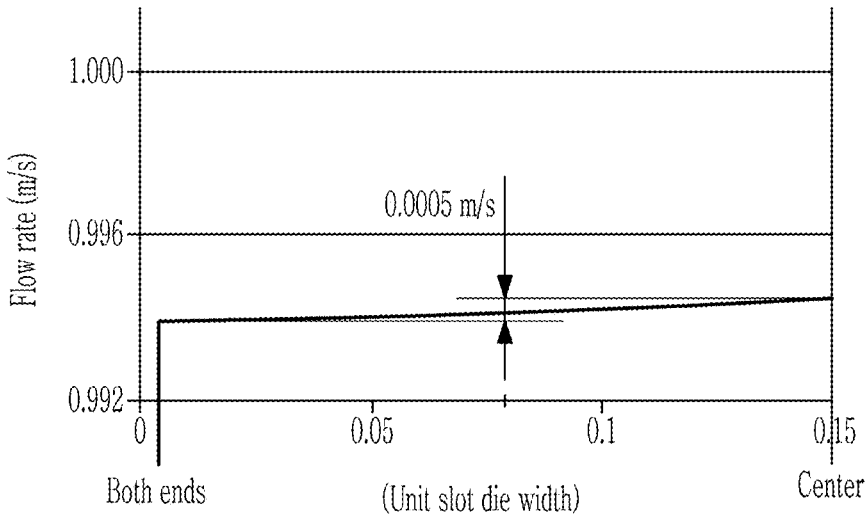
FIG. 2 illustrates a graph of a flow rate distribution of slurry along a width direction of a multi-slot die (electrode substrate) according to one or more embodiments of the present disclosure.

FIG. 2 is a graph of a flow rate distribution of slurry according to a width direction of a multi-slot die (electrode substrate) according to one or more embodiments of the present disclosure. Referring to FIG. 2, if viewed from a width direction of the multi-slot die, a supply flow rate of an active material slurry may be 0.9945 m/s at the center and may be 0.994 m/s at both ends. Accordingly, the deviation of the slurry flow rate in the width direction of the slot die may be 0.0005 m/s.

Comparing FIG. 1 and FIG. 2, the flow rate at both ends in the width direction of the slot die may be the same as 0.994 m/s in the embodiment compared to 0.994 m/s in the prior art. In this case, the embodiment may be a single slot die of a multi-slot die, while the prior art is a single slot die.

At the center of the width direction of the multi-slot die, the flow rate of the embodiment is 0.9945 m/s, which is slightly lower than the flow rate of 1.0 m/s of the prior art. In terms of the deviation of the loading level in the width direction of the slot die, 0.0005 m/s in the embodiment is much smaller than 0.006 m/s in the prior art.

Therefore, compared to the prior art, the present embodiment may have higher quality in terms of the double-sided step (AS), coating width, and width loading level of the active material coating portion (CP) formed on both sides of the electrode substrate (ES). Hereinafter, an embodiment implementing this will be described in detail.

Figure 3A:
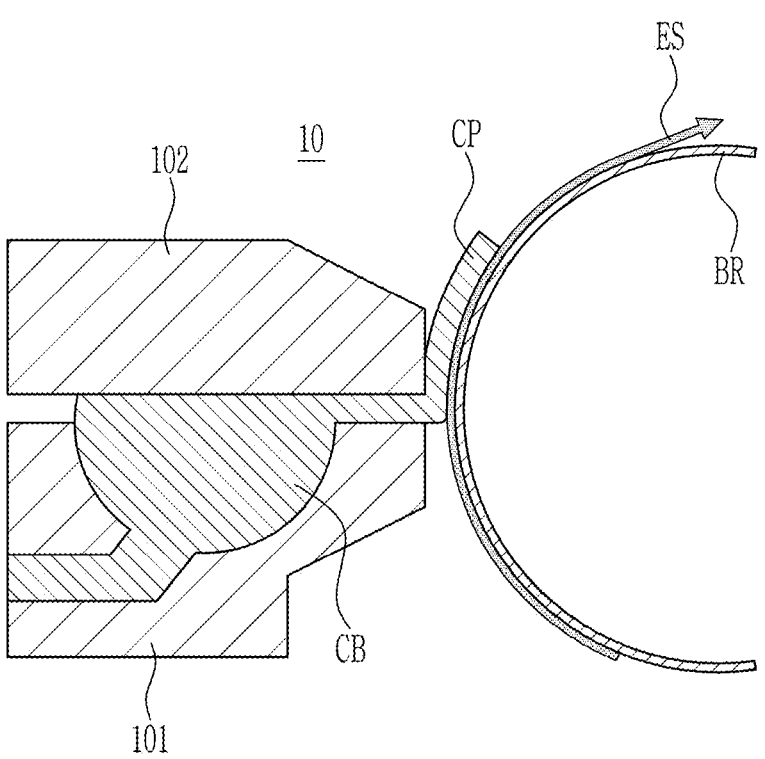
FIG. 3A illustrates a cross-sectional view of applying an active material slurry to an electrode substrate using a multi-slot die according to one or more embodiments of the present disclosure.
Figure 3B:
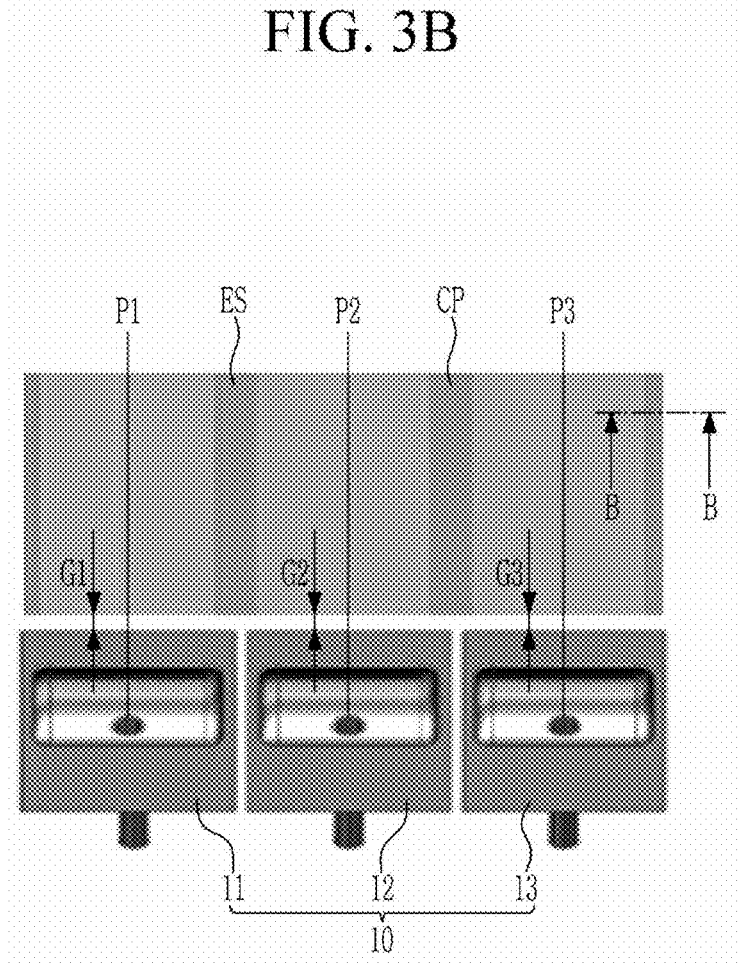
FIG. 3B illustrates a top plan view of a concept of forming a multi-column coating portion on an electrode substrate by applying an active material slurry to the electrode substrate using a multi-slot die according to one or more embodiments of the present disclosure.

FIG. 3A illustrates a cross-sectional view of applying an active material slurry to an electrode substrate using a multi-slot die according to one or more embodiments of the present disclosure, and FIG. 3B illustrates a top plan view of a concept of forming a multi-column coating portion on an electrode substrate by applying an active material slurry to the electrode substrate using a multi-slot die according to one or more embodiments of the present disclosure.

Referring to FIG. 3A and FIG. 3B, dies 10 are configured to form a coating portion CP by coating a supplied active material slurry on an electrode substrate ES proceeding while being supported by a backup roll BR via a chamber CB formed between a lower die 101 and an upper die 102.

Figure 3C:
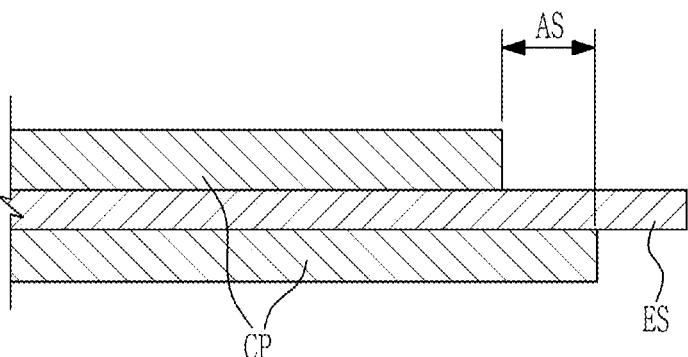
FIG. 3C illustrates a cross-sectional view taken along line B-B in FIG. 3B according to one or more embodiments of the present disclosure.
Figure 4:
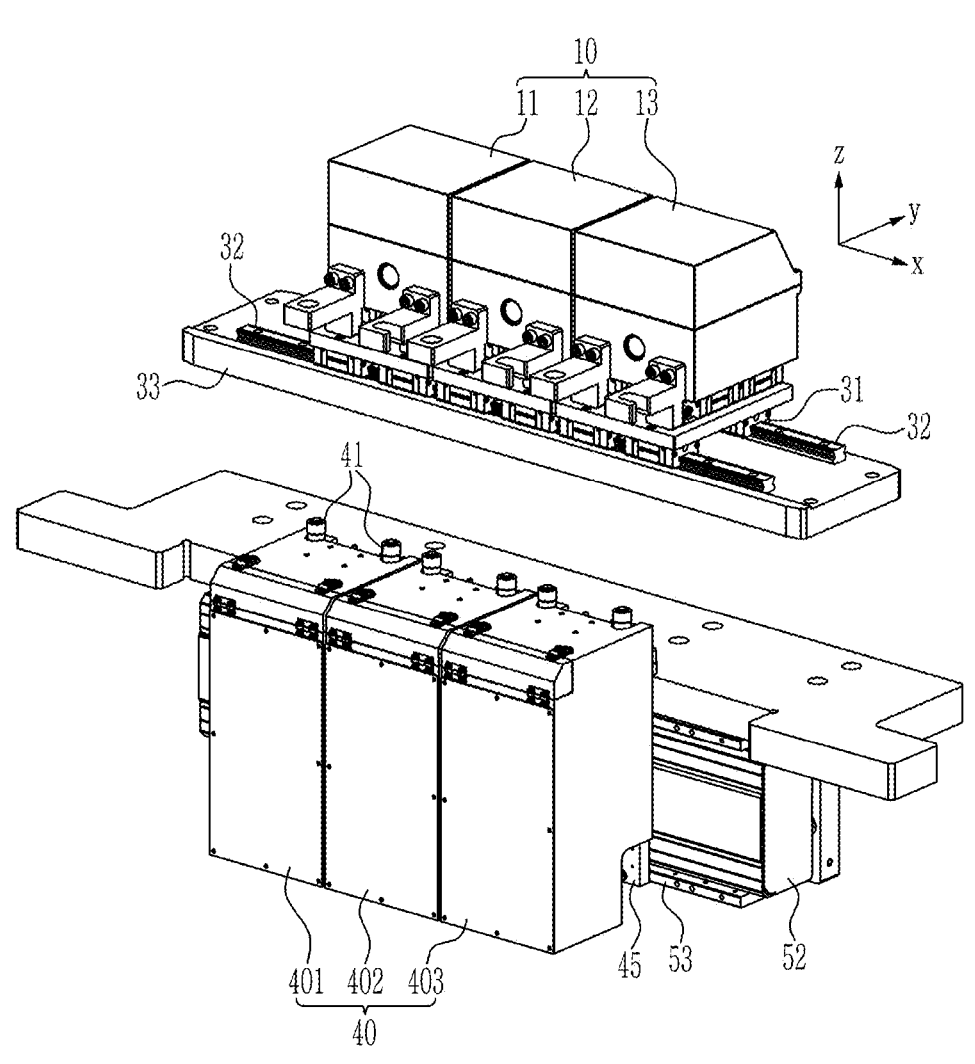
FIG. 4 illustrates a partially exploded perspective view of the multi-slot die of FIG. 3 according to one or more embodiments.
Figure 5:
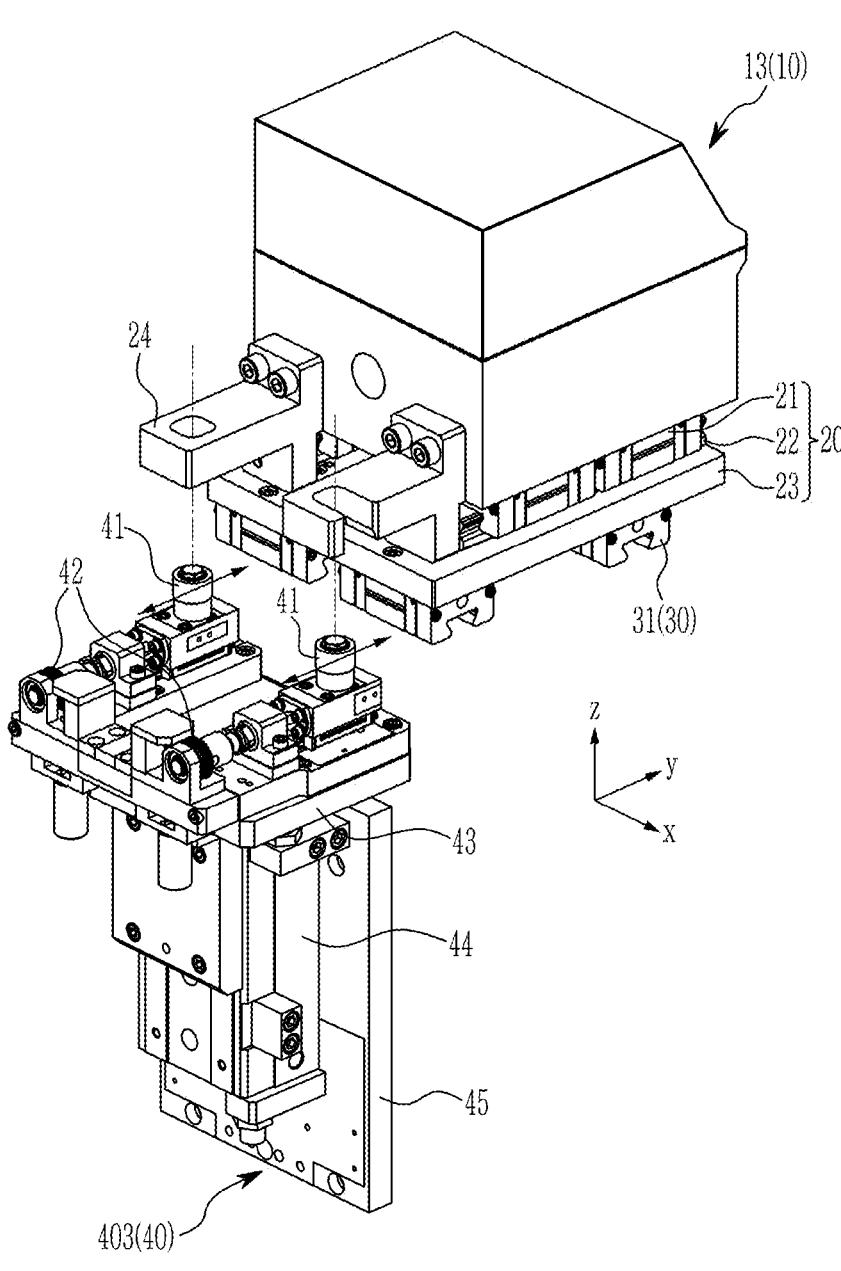
FIG. 5 illustrates a partially exploded perspective view of a die control unit and one slot die among the multi-slot dies of FIG. 3 according to one or more embodiments.

FIG. 3C illustrates a cross-sectional view taken along line B-B in FIG. 3B according to one or more embodiments, FIG. 4 illustrates a partially exploded perspective view of the multi-slot die of FIG. 3B according to one or more embodiments, and FIG. 5 illustrates a partially exploded perspective view of a die control unit and one slot die among the multi-slot dies of FIG. 3B according to one or more embodiments.

Referring to FIG. 3A to 5, the multi-slot die may include a plurality of dies (10; 11, 12, 13), a plurality of gap adjustment assemblies 20 and a die position adjustment assembly 30.

As an example, the plurality of dies 10 may include first, second, and third dies 11, 12, and 13. The plurality of dies 10 may be formed in multiple columns by separating the continuous coating portion CP in the length direction (e.g., the y direction in FIG. 4) on one continuously progressed electrode substrate ES using a supplied active material slurry along the width direction (e.g., the x direction in FIG. 4) crossing the length direction. The first, second, and third dies 11, 12, and 13 may form the coating portion CP in three or more columns. The double-sided coating portion CP of the electrode substrate ES has an alignment step AS for alignment in the width direction.

Figure 6:
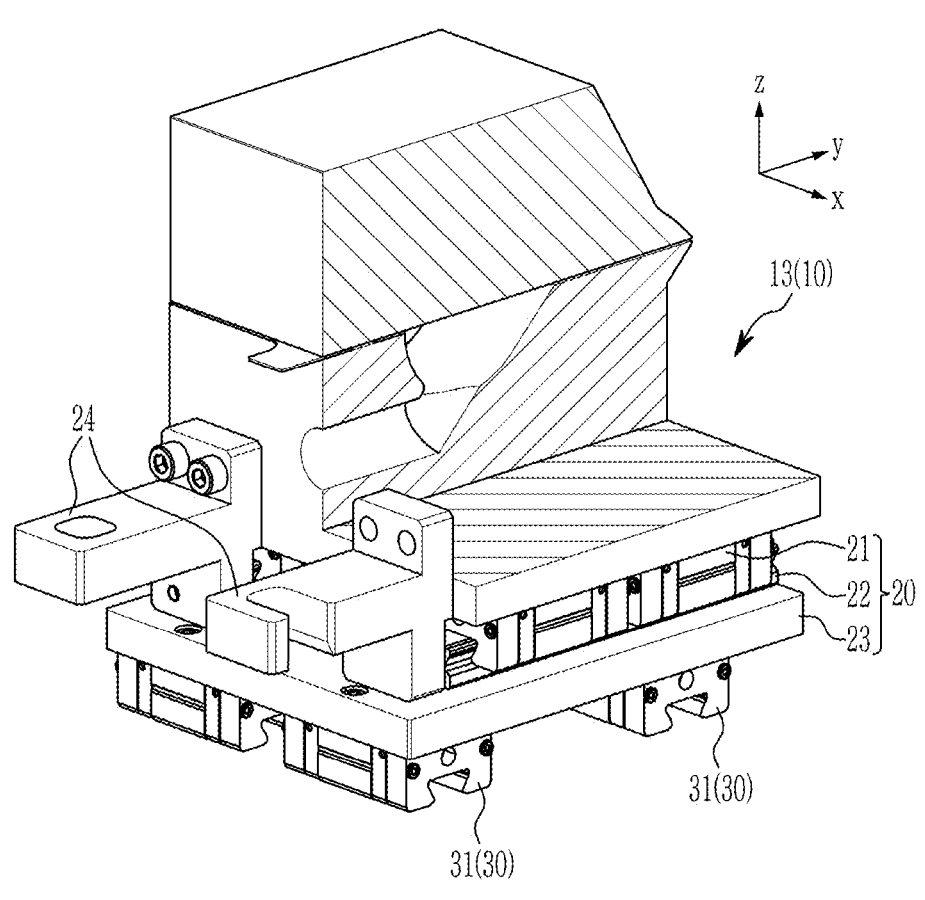
FIG. 6 illustrates a partially cross-sectional perspective view of a coupled state of one slot die and a gap adjustment assembly in FIG. 5 according to one or more embodiments.

FIG. 6 illustrates a partially cross-sectional perspective view of a coupled state of one slot die and a gap adjustment assembly in FIG. 5 according to one or more embodiments. Referring to FIG. 4 to FIG. 6, the gap adjustment assemblies 20 may correspond to the first, second, and third dies 11, 12, and 13, and may be configured to independently adjust first, second, and third gaps G1, G2, and G3 respectively set between the electrode substrate ES and the first, second, and third dies 11, 12, and 13 along the discharge direction (e.g., the y-axis direction) of the die. Since the first, second, and third gaps G1, G2, and G3 may be adjusted by the gap adjustment assembly 20, the coating width and the quality of the rolling level of the coating portion CP may be improved.

Figure 7:
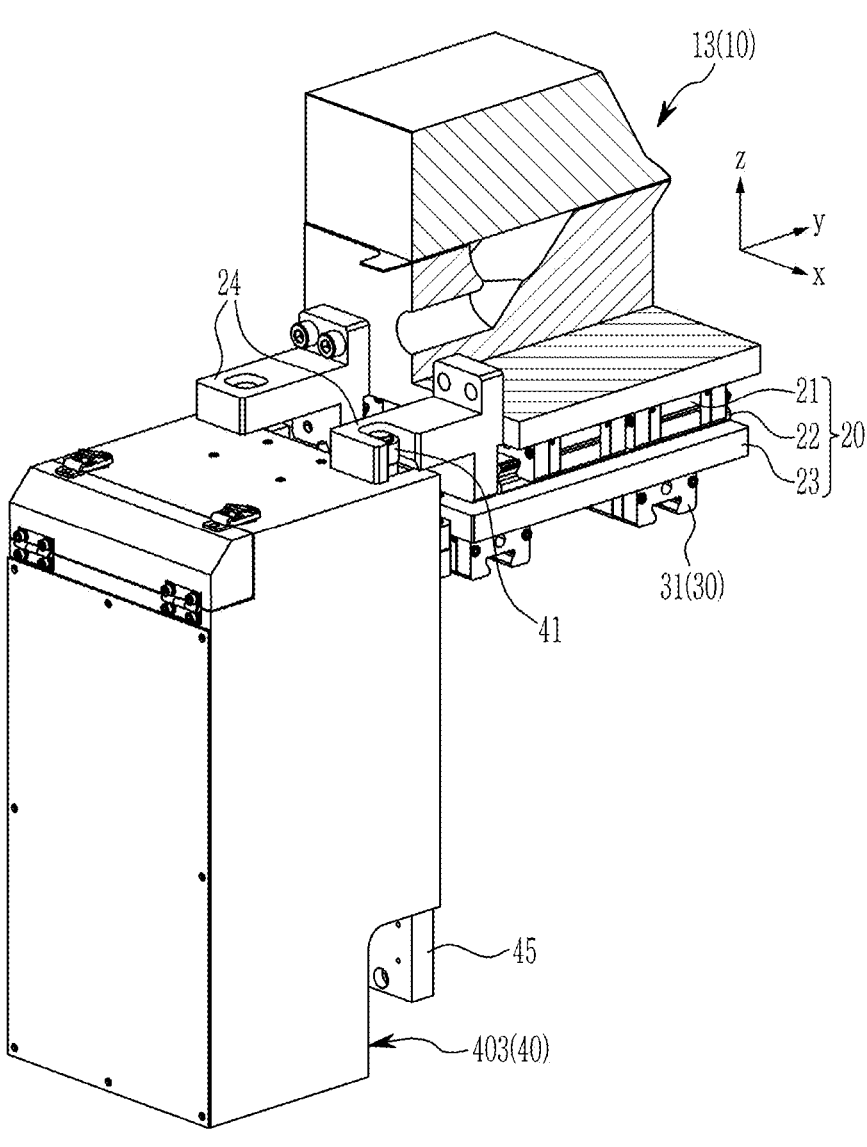
FIG. 7 illustrates a partially cross-sectional perspective view of a coupled state of a gap adjustment assembly of FIG. 6 and a die control unit according to one or more embodiments.
Figure 8:
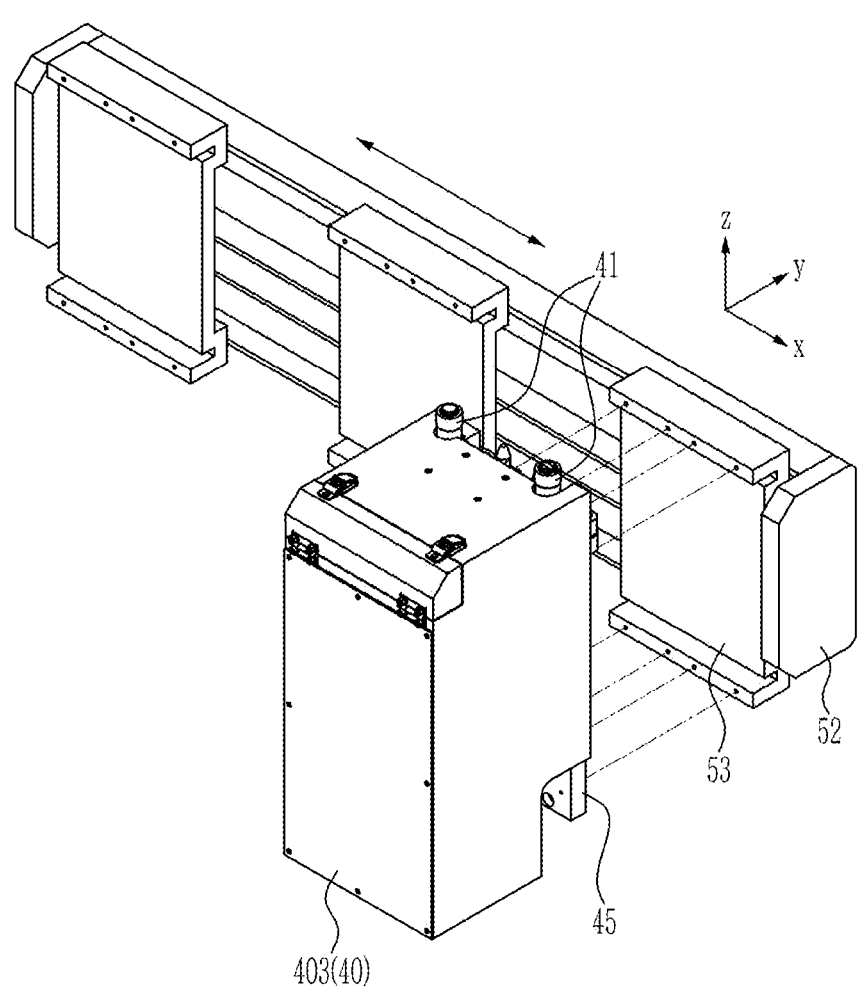
FIG. 8 illustrates a perspective view of a coupled state of the die control unit, moving member, and linear motor of FIG. 7 according to one or more embodiments.

FIG. 7 illustrates a partially cross-sectional perspective view of a coupled state of a gap adjustment assembly of FIG. 6 and a die control unit according to one or more embodiments, and FIG. 8 illustrates a perspective view of a coupled state of the die control unit, moving member and linear motor of FIG. 7 according to one or more embodiments.

Referring to FIG. 4 to FIG. 8, the die position adjustment assembly 30 may correspond to the gap adjustment assemblies 20, and may be configured to independently adjust first, second, and third die positions P1, P2, and P3 of the first, second, and third dies 11, 12, and 13 in the width direction (e.g., the x-axis direction). Since the first, second, and third die positions P1, P2, and P3 may be adjusted by the die position adjustment assembly 30, the coating portion CP may be aligned on both surfaces of the electrode substrate ES. Accordingly, the die position adjustment assembly 30 may improve the quality of the step AS on both surfaces of the coating portion CP.

Referring back to FIG. 3A to FIG. 6, the gap adjustment assemblies 21-23 (20) support the first, second, and third dies 11, 12, and 13, respectively. Each of the gap adjustment assemblies 20 may include a die support block 21, a gap guide 22, and a first fixing plate 23 to allow for independently adjusting the first, second, and third gaps G1, G2, and G3 of the first, second, and third dies 11, 12, and 13.

Taking the third die 13 as an example, the die support block 21 may be configured to support the third die 13 on its upper surface and to be moved in the discharge direction (e.g., the y-axis direction). The gap guide 22 may be coupled to the die support block 21 to move the die support block 21 in the discharge direction (e.g., the y-axis direction) to adjust the third gap G3 set between the third die 13 supported by the die support block 21 and the electrode substrate ES. The first fixing plate 23 supports the gap guide 22.

Therefore, the third die 13 is installed on the first fixing plate 23 through the gap adjustment assembly 20, and the third die 13 is moved forward and backward in the discharge direction (e.g., the y-axis direction) by the gap adjustment assembly 20 to adjust the third gap G3. In this way, since the first, second, and third dies 11, 12, and 13 are provided in respective gap adjustment assemblies 20, the first, second, and third gaps G1, G2, and G3 may be independently adjusted.

Figure 10:
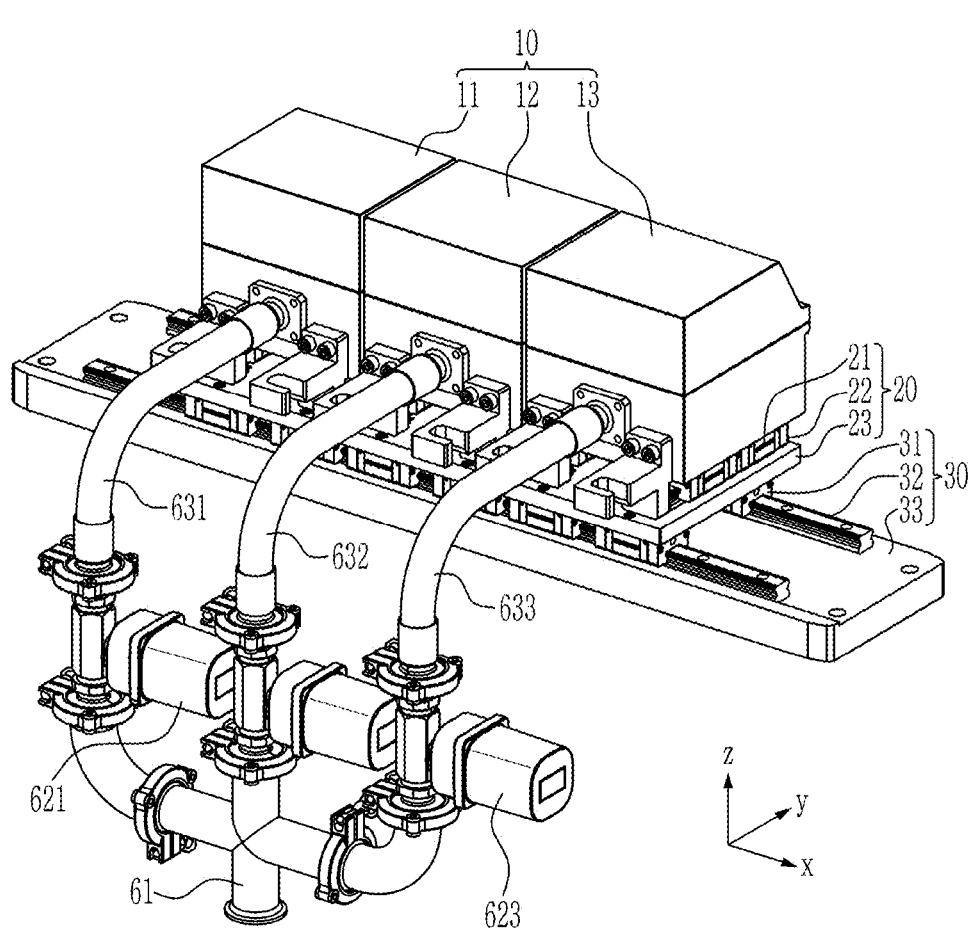
FIG. 10 illustrates a perspective view of a slurry supply system for supplying an active material slurry to the multi-slot die of FIG. 3A, FIG. 3B, and FIG. 4 according to one or more embodiments.

Referring to FIG. 10, the die position adjustment assembly 30 may support a plurality of first fixing plates 23 that support each of the first, second, and third dies 11, 12, and 13, respectively, corresponding to (e.g., aligned with) the gap adjustment assemblies 20. As an example, the die position adjustment assembly 30 further may further include a plurality of plate support blocks 31, a position guide 32 and a second fixing plate 33.

The plurality of plate support blocks 31 may be configured to support each of the first fixing plates 23 upward and to move in the width direction (e.g., the x-axis direction). The position guide 32 may be coupled to the plate support block 31 and may extend in the width direction (e.g., the x-axis direction) to move the plate support block 31 left and right (on the drawing) in the width direction (e.g., the x-axis direction) to adjust the first, second, and third die positions P1, P2, and P3. The second fixing plate 33 corresponds to all of the gap adjustment assemblies 20 and supports the position guide 32.

Accordingly, a plurality of slot dies 10 may be installed on the second fixing plate 33 through the position guide 32 and the gap adjustment assemblies 20. As the first, second, and third dies 11, 12, and 13 are moved in the width direction (e.g., the x-axis direction) by the die position adjustment assembly 30 and the gap adjustment assembly 20, the first, second, and third die positions P1, P2, and P3 of the electrode substrate ES may be adjusted and set in the width direction (e.g., the x-axis direction), and while being moved forward and backward in the discharge direction (e.g., the y-axis direction), the first, second, and third gaps G1, G2, and G3 may be adjusted and set.

Referring back to FIG. 4 to FIG. 8, the multi-slot die according to one or more embodiments may further include die control units (40; 401, 402, 403). The die control units 40 may be provided respectively corresponding to (e.g., aligned with) aligned with the first, second, and third dies 11, 12, and 13 and may be respectively coupled to the first, second, and third dies 11, 12, and 13.

Accordingly, the die control units 40, that is, the first, second, and third die control units 401, 402, and 403, respectively may control the first, second, and third gaps G1, G2, and G3 and the first, second, and third die positions P1, P2, and P3 of the first, second, and third dies 11, 12, and 13.

For example, referring to FIG. 7, the third die control unit 403 may include a coupling member 41, a gap adjustment member 42, a lifting plate 43, and a lifting cylinder 44, and may be coupled to the third die 13. However, this is merely one example.

The coupling member 41 may protrude upward from the third die control unit 403 and may be coupled to a coupling hole 24 provided in the third die 13. The gap adjustment member 42 may be configured to adjust the coupling member 41 in the gap adjustment direction (e.g., the y-axis direction). As an example, the gap adjustment member 42 may finely adjust the third gap G3 in units of 0.001 mm pitch.

The lifting plate 43 may include the coupling member 41 and the gap adjustment member 42. The lifting cylinder 44 may be coupled to the lifting plate 43 and may be fixed to the side plate 45. The lifting cylinder 44 moves up and down while acting as a reaction force against the side plate 45 to insert or withdraw the coupling member 41 provided on the lifting plate 43 into the coupling hole 24.

As the gap adjustment member 42 is adjusted while the coupling member 41 is inserted into the coupling hole 24, the coupling member 41 may move the third die 13 on the gap adjustment assembly 20 through the coupling hole 24. Accordingly, the third gap G3 may be adjusted and set.

In one or more embodiments, the multi-slot die may further include a base plate 51 and a linear motor 52. The base plate 51 supports the second fixing plate 33 installed on its upper surface. The linear motor 52 may be provided on a lower side of the base plate 51. The side plate 45 may be installed on a moving member 53 of the linear motor 52.

As the linear motor 52 is driven, the moving member 53 may be moved in the width direction (e.g., the x-axis direction). Accordingly, the third die position P3 may be adjusted and set as the third die control unit 403 installed on the moving member 53 using the side plate 45 moves in the width direction (e.g., the x-axis direction).

FIG. 9 illustrates a flowchart of forming a multi-column coating portion on an electrode substrate by applying an active material slurry to the electrode substrate using a multi-slot die coating method according to one or more embodiments of the present disclosure. Referring to FIG. 9, the multi-slot die coating method of the embodiment includes a first step (ST1), a second step (ST2), a third step (ST3), a fourth step (ST4) and a fifth step (ST5).

In the first step (ST1), data on the loading level, coating width, and double-sided step AS of the coating portion CP to be applied with the active material slurry may be inputted to the continuously supplied electrode substrate ES. The input data may include density data and vision data. The density data may be a loading level, and the vision data may be a coating width, a double-sided step AS and a coating position.

In the second step (ST2), adjustment factors may be determined. The adjustment factors may include a total loading level central value, a hot loading level central value, a double-sided step AS, a coating width, a coating position, and a width direction loading level, of the coating portion CP.

In the third step (ST3), a total flow rate of the slurry to be supplied may be determined, during coating. That is, in the third step (ST3), the total flow rate of supplying the active material slurry from a pump P to the dies (10; 11, 12, 13) may be determined by controlling the pump P to supply the active material slurry according to the center value of the total loading level. To this end, a three-way valve 3WV installed between the pump P and a manifold 61 may be controlled to return excess flow to a tank T.

In the fourth step (ST4), the flow rate of the active material slurry may be controlled and supplied for each individual die during coating. That is, in the fourth step (ST4), control valves (62; 621, 622, 623) may be proportionally controlled according to the hot loading level center value, so that the active material slurry may be supplied to each die (10; 11, 12, 13), and the coating portion CP may be formed in multiple columns on the electrode substrate ES, respectively.

In the fifth step (ST5), the first, second, third gaps G1, G2, and G3 of the dies 10, that is, the first, second, third dies 11, 12, and 13, and the first, second, third die positions P1, P2, and P3 may be adjusted. In the fifth step (ST5), the coating width may be controlled by adjusting the gap adjustment member 42 in the die control units (40; 401, 402, 403), and the coating position and the double-sided step AS may be controlled by adjusting the linear motor 52.

Further, in the fifth step ST5, the positions P1, P2, and P3 of the first, second, and third dies 11, 12, and 13 may be adjusted according to the double-sided step AS, respectively. In addition, in the fifth step (ST5), the first, second, and third gaps G1, G2, and G3 of the first, second, and third dies 11, 12, and 13 may be adjusted according to the coating width, coating position, and width direction loading level, respectively.

In addition, in the first step (ST1), new data on the loading level, coating width, coating position and double-sided step AS obtained in the fifth step (ST5) may be compared with the existing data on the inputted loading level, coating width, coating position and double-sided step AS.

In the second step (ST2), the new data and the existing data may be compared to determine the adjustment factors. According to this determination, the first, second, and third gaps G1, G2, and G3 and the first, second, and third die positions P1, P2, and P3 may be continuously adjusted in the next fifth step ST5. Accordingly, if the coating portion CP is coated in multiple columns with the active material slurry on the electrode substrate ES, the quality of the multi-column coating portion CP may be improved.

Figure 11:
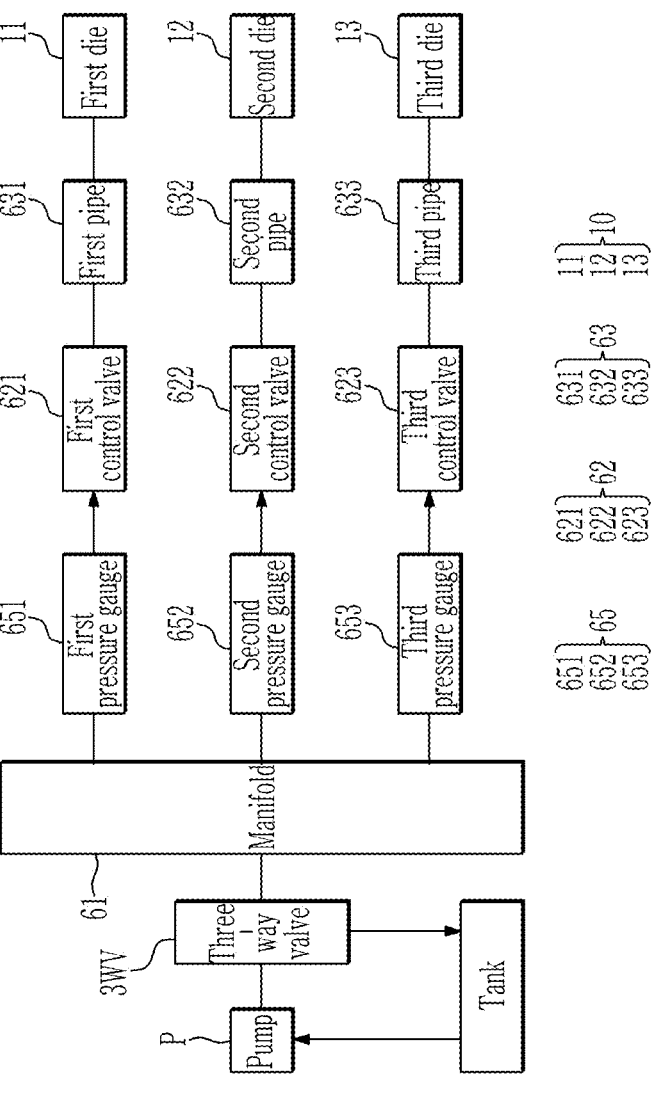
FIG. 11 illustrates a block diagram of the slurry supply system of FIG. 10 according to one or more embodiments.

FIG. 10 illustrates a perspective view of a slurry supply system for supplying an active material slurry to the multi-slot die of FIG. 3A, FIG. 3B, and FIG. 4 according to one or more embodiments, and FIG. 11 illustrates a block diagram of the slurry supply system of FIG. 10 according to one or more embodiments.

Referring to FIG. 10 and FIG. 11, the slurry supply system may be configured to supply an active material slurry to the multi-slot die.

As an example, the slurry supply system may include a manifold 61, a plurality of control valves (62; 621, 622, 623), a plurality of pipes (63; 631, 632, 633) and a plurality of return pipes (64; 641, 642, 643). The manifold 61 may supply the active material slurry continuously supplied to the plurality of dies 10 by driving the pump P and the three-way valve 3WV. The slurry may be applied to both surfaces of the electrode substrate ES to form the coating area CP.

The control valves 62, that is, the first, second, and third control valves 621, 622, and 623 may be coupled to the pipes 63 (that is, the first, second, and third pipes 631, 632, and 633) and divided into three from the manifold 61 to independently supply the slurry from the manifold 61 to the first, second, and third dies 11, 12, and 13.

The first, second, and third pipes 631, 632, and 633 independently couple the first, second, and third control valves 621, 622, and 623 to the first, second, and third dies 11, 12, and 13. The first, second, and third control valves 621, 622, and 623 may be formed as proportional control valves.

The slurry supply system returns surplus or uncoated slurry to the tank T through the three-way valve 3WV installed between the pump P and the manifold 61. That is, the slurry supply system may determine the total flow rate supplied to the manifold 61 and the first, second, and third control valves 621, 622, and 623 by the control of the pump P and the three-way valve 3WV, and control the amount of slurry flowing into the first, second, and third dies 11, 12, and 13 by the opening amount of the first, second, and third control valves 621, 622, and 623.

In some embodiments, the first, second, and third pipes 631, 632, and 633 may be formed as flexible pipes, the first, second, and third gaps G1, G2, and G3 of the first, second, and third dies 11, 12, and 13 may be adjusted by the gap adjustment assemblies 20 and the die position adjustment assembly 30, and the adjustment operation is not disturbed if the first, second, and third die positions P1, P2, and P3 are adjusted.

Figure 12:
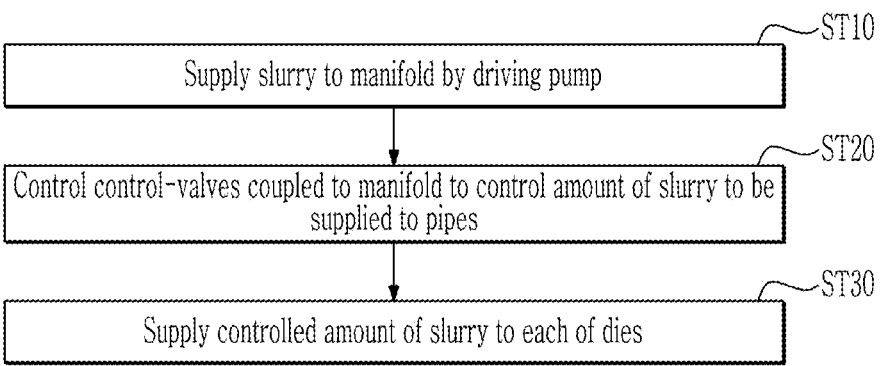
FIG. 12 illustrates a flowchart of supplying an active material slurry to a multi-slot die using a slurry supply method according to one or more embodiments of the present disclosure.

FIG. 12 is a flowchart of supplying an active material slurry to a multi-slot die using a slurry supply method according to one or more embodiments of the present disclosure. Referring to FIG. 12, the method of supplying the slurry according to the embodiment includes a first step (ST10), a second step (ST20), and a third step (ST30).

In the first step (ST10), an active material slurry to be applied to the electrode substrate ES continuously supplied by driving the pump P may be supplied to the manifold 61. In the second step (ST20), the amount of slurry to be supplied to the plurality of pipes (63; 631, 632, 633) may be controlled by controlling the plurality of control valves (62; 621, 622, 623) coupled to the manifold 61. In the third step (ST30), a controlled amount of slurry may be supplied to each of the dies (10; 11, 12, 13) coupled to the pipes (63; 631, 632, 633).

In the second step ((ST20), the control valves (62; 621, 622, 623) may be proportionally controlled. That is, the control valves (62; 621, 622, 623) may control the amount of slurry supplied by controlling the ratio (%) of the opening amount to the full opening amount (100%).

The active material slurry passing through in the second and third steps (ST20 and ST30) may be applied to the electrode substrate ES through the dies (10; 11, 12, 13) to form the coating portion CP. In this case, the control valves (62; 621, 622, 623) may control the quality of the loading level, which is density data of the coating portion CP.

The present disclosure provides a multi-slot die that coats an electrode substrate of a rechargeable battery with an active material slurry in multiple columns and independently controls quality of a multi-column coating portion. The present disclosure also provides a coating method that coats an active material slurry on an electrode substrate in multiple columns using the multi-slot die and may independently control quality of a multi-row coating portion.

The present disclosure also provides a slurry supply system that supplies an active material slurry to an electrode substrate of a rechargeable battery in multiple columns. The present disclosure further provides a slurry supply method that supplies an active material slurry to an electrode substrate in multiple columns using the slurry supply system.

As described above, the multi-slot die and the multi-slot die coating method of the embodiment(s) include a plurality of dies, gap adjustment assemblies, and die position adjustment assemblies to independently control gaps and independently control die positions, thereby improving quality of a multi-column coating portion if coating an electrode substrate with an active material slurry in multiple columns.

In addition, the slurry supply system and the slurry supply method according to one or more embodiments may determine a total amount of slurry to be supplied by a pump and a three-way valve, and may supply the slurry by proportionally controlling control valves, thereby improving quality of a loading level.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

DESCRIPTION OF SYMBOLS

10: die
11, 12, 13: first, second, third dies
20: gap adjustment assembly
21: die support block
22: gap guide
23: first fixing plate
24: coupling hole
30: die position adjustment assembly
31: plate support block
32: position guide
33: second fixing plate
40: die control unit
41: coupling member
42: gap adjustment member
43: lifting plate
44: lifting cylinder

45: side plate
51: base plate
52: linear motor
53: moving member
61: manifold
62: control valve
63: pipe
64: return pipe
101: lower die
102: upper die
401, 402, 403: first, second, third die control units
621, 622, 623: first, second, third control valves
631, 632, 633: first, second, third pipes
641, 642, 643: first, second, third return pipes
CP: coating portion
G1, G2, G3: first, second, third gaps
ES: electrode substrate
P: pump
BR: backup roll
CB: chamber
P1, P2, P3: first, second, third die positions
What is claimed is:

1. A multi-slot die, comprising:
a plurality of dies that form a continuous coating portion along a length direction on an electrode substrate that continuously proceeds in multiple columns to be spaced apart from each other along a width direction intersecting the length direction, using a supplied active material slurry;
a plurality of gap adjustment assemblies that are provided corresponding to each of the dies and independently adjust gaps set between each of the dies and the electrode substrate along a discharge direction of each of the dies;
a die position adjustment assembly that is provided corresponding to the gap adjustment assemblies and independently adjusts positions of the dies with respect to the width direction; and a plurality of die control units coupled to each of the dies to control the respective one of the gaps and the die position of each of the dies, wherein each of the die control units includes:
a coupling member coupled to a coupling hole provided in each of the dies,
a gap adjustment member adjusting the coupling member in a gap adjustment direction,
a lifting plate including the coupling member and the gap adjustment member, and
a lifting cylinder coupled to the lifting plate to be fixed to a side plate.

2. The multi-slot die as claimed in claim 1, wherein each of the plurality of gap adjustment assemblies includes
a die support block that supports each of the dies and moves in the discharge direction,
a gap guide that is coupled to the die support block and moves the die support block in the discharge direction to adjust a respective one of the gaps, and
a first fixing plate supporting the gap guide.

3. The multi-slot die as claimed in claim 2, wherein the die position adjustment assembly includes
a plurality of plate support blocks supporting the first fixing plate corresponding to each of the gap adjustment assemblies and moving in the width direction,
a position guide coupled to the plate support blocks to adjust a die position by moving each of the plate support blocks in the width direction, and
a second fixing plate supporting the position guide.

4. The multi-slot die as claimed in claim 1, further comprising:
a base plate supporting the second fixing plate, and
a linear motor provided on a lower side of the base plate, wherein the side plate is installed on a moving member of the linear motor.

* * * * *